| United States Patent Office | 3,308,903
Patented Mar. 14, 1967 |

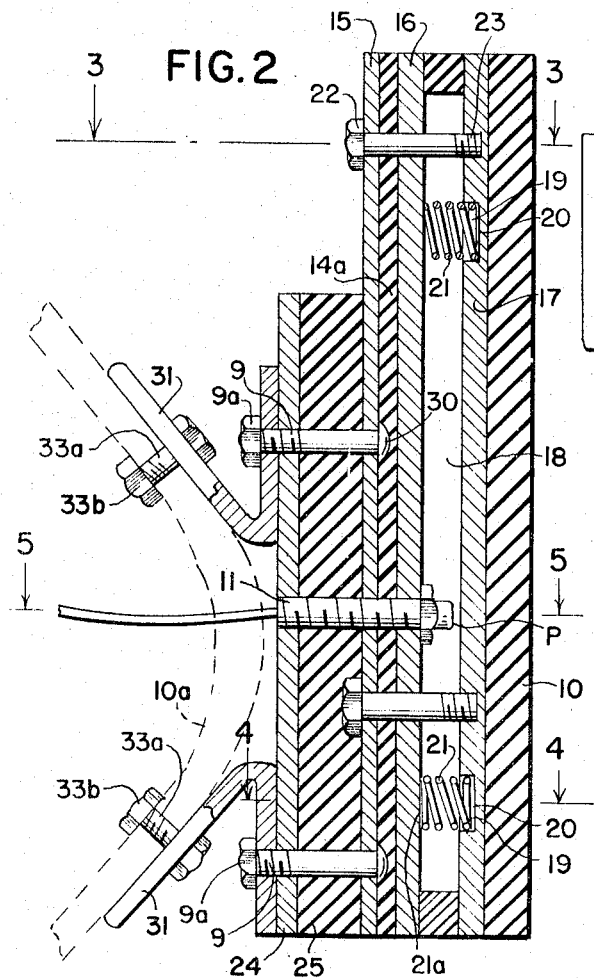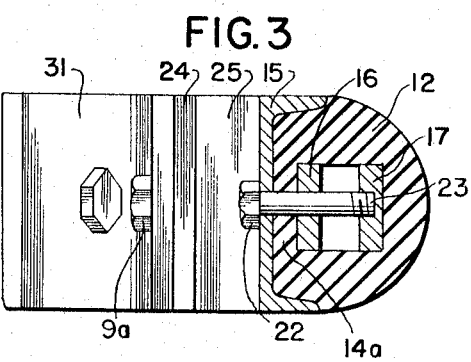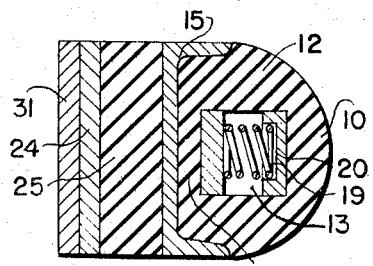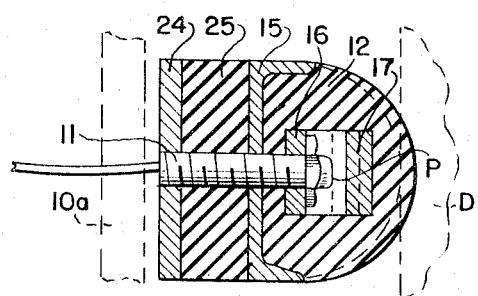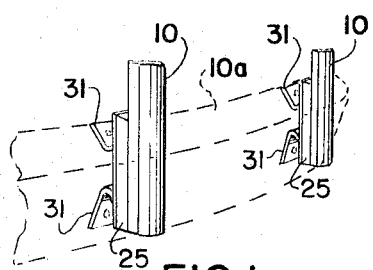

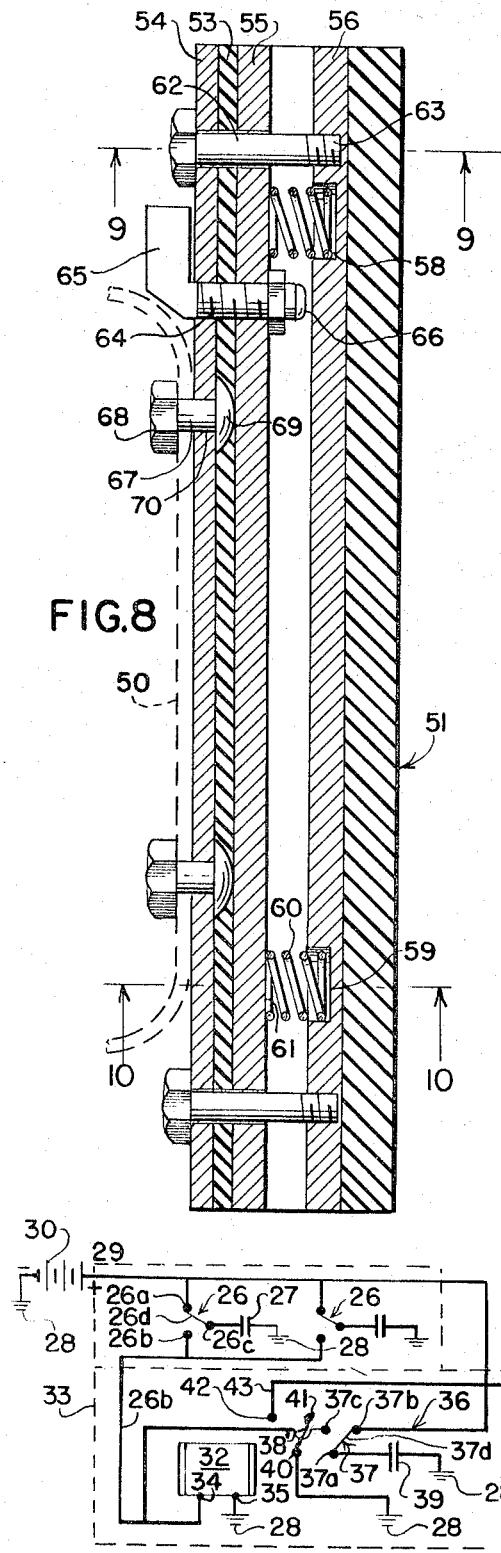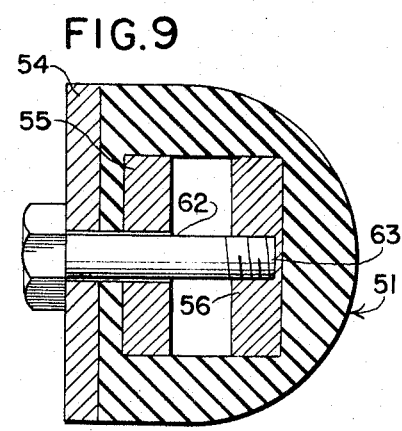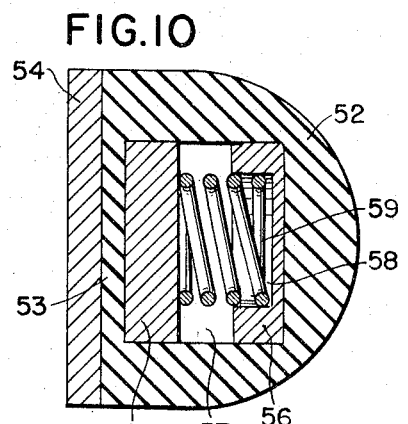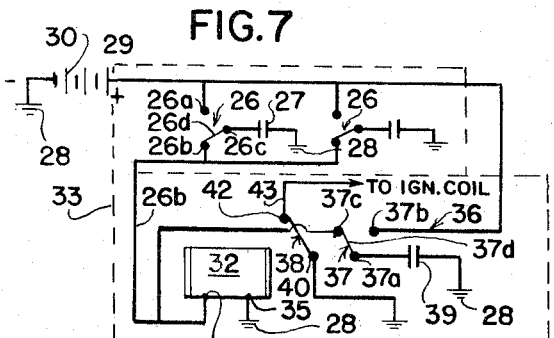
INVENTORS
Leonard H. Sobel &
Martin Sobel
by Sparrow and Sparrow
ATTORNEYS.

3,308,903
MOTOR VEHICLE PUSH PREVENTING
BUMPER GUARD
Leonard H. Sobel and Martin Sobel, both of 312 Penn St.,
Brooklyn, N.Y. 11211
Filed Oct. 14, 1963, Ser. No. 315,785
15 Claims. (Cl. 180—83)

This application relates to the same subject matter as my copending application, Ser. No. 113,522, filed May 29, 1961, now abandoned.

This invention relates generally to rendering the power plant of a moving motor vehicle inoperative when coming in contact with an obstruction, such as for example, another motor vehicle.

More particularly, the invention relates to means for deactivating or de-energizing the power plant of the driven motor vehicle when the bumper guard comes in contact with said obstruction.

The invention is particularly useful in connection with a motor vehicle operated by a driver who is not the owner thereof, and who consequently inconsiderately uses the vehicle in order to move or push a parked or otherwise stationary or disabled automobile, straining the transmission of the vehicle driven by him. It is known that drivers of fleet taxi cabs often accept gratuities for using the taxi to start stalled vehicles by pushing.

It is a purpose of the present invention to prevent a motor vehicle from pushing another vehicle by stopping or making inactive the motor in the vehicle attempting to do the pushing, this stopping of the motor being accomplished by providing in the bumper guard in the pushing vehicle a device having incorporated therein a pressure sensitive bumper switch which is adapted to supply a momentary impulse designed to deliver this impulse when the guard experiences a predetermined amount of pressure. In order to accomplish the foregoing, there is provided in the switch system a time delay factor for maintaining the ignition circuit inactive until the flywheel of the engine or motor comes to rest in the event that the vehicles separate or disengage, for example, bounce apart, and there is no pressure exerted on the bumper or bumper guard of the pushing vehicle. A characteristic of the switch system is to allow the driver of the pushing vehicle to start the engine and to back away from the vehicle being pushed or contacted in the event that the latter remains close enough to exert a pressure on the switch.

It is an object of the invention to equip a motor vehicle with a system and/or device, including electric switches, which will render the motor vehicle inoperative when its bumper guard comes in contact with another vehicle.

It is a further object of the present invention to provide means whereby it is rendered impossible to operate the motor vehicle when the same comes in contact with another vehicle or object with a force such as is necessary to actuate electric switch means de-energizing the power plant system, a time delay factor being introduced for making the ignition circuit inoperative until the engine comes to rest in the event that the vehicles disengage so that there is no pressure on the said bumper guard.

A still further object of the present invention is to associate such switch means with the bumper guard of a motor vehicle.

The device or system can be applied to all types of automobiles or motor vehicles without altering the normal operation thereof, except during contact or collision. It is sturdy and not likely to get out of order, and will remain in operative condition for the purpose intended.

A more particular object of the present invention is to provide an auto push preventer which will serve to ground or cut out the ignition system, thus preventing the igniting of the fuel.

A further object of the present invention is to provide a switch for the above purpose with means for mounting the switch to a bumper guard; a further object being to provide the switch with an elastic housing adapted to return to normal shape after being depressed, thus providing a spring action to return a contacting plate to a non-contacting position.

These and other objects and certain advantages of the invention will appear as the description proceeds, it being understood, however, that it is not intended that the invention be limited to the exact details described herein which illustrate certain embodiments of many which may be realized or obtained as a result of the knowledge gained through or gleaned from an understanding of the invention, and it is further intended that there be included as part of the invention all such obvious changes and modifications thereof as would occur to a person skilled in the art to which this invention pertains and as would fall within the scope of the claims appended thereto.

In the drawings:

FIG. 1 is a perspective view of bumper guards embodying push-prevent switch means, according to the invention, mounted on the front bumper of a motor vehicle;

FIG. 2 is a vertical sectional view of one of the bumper guards seen in FIG. 1;

FIG. 3 is a sectional view taken on line 3—3 of FIG. 2;

FIG. 4 is a sectional view taken on line 4—4 of FIG. 2;

FIG. 5 is a sectional view taken on line 5—5 of FIG. 2, showing position of certain elements upon contact of pushing vehicle and vehicle being pushed;

FIG. 6 is a schematic diagram of the electric system embodied in the invention, the switches being shown in open positions;

FIG. 7 is the schematic diagram shown in FIG. 6, the switches being shown in closed positions;

FIG. 8 is a vertical sectional view of a bumper guard, according to the invention, in a modified form, the same embodying push-prevent switch means;

FIG. 9 is a sectional view taken on line 9—9 of FIG. 8; and

FIG. 10 is a sectional view taken on line 10—10 of FIG. 8.

Referring now in more detail to the drawing which illustrates, by way of examples only, embodiments by which the invention may be realized. There is shown in FIG. 1 bumper guards 10 mounted on a bumper 10a of a motor vehicle, such as an automobile, which bumper guards have incorporated therein a push-prevent switch means made according to the invention.

The push-prevent device is employed for preventing the pushing of one motor vehicle by another vehicle to which the device is attached.

Referring to FIG. 2, bumper guard 10 comprises a resilient housing 12 having a passage 13 running therethrough. Housing 12 is made of rubber, rubber composition or other suitable material and is preferably substantially dome-shaped in section (as seen in FIGS. 3, 4 and 5). Abutting against the rear portion 14 of housing 12 is a channel plate 15 which is preferably made of metal, such as, for example, steel. Within passage 13 are two spaced-apart metal plates or bars 16 and 17, preferably made of steel, the space between plates 16 and 17 being indicated by number 18. Spaced recesses 19 are formed in plate or bar 17 accommodating respective end portions 20 of preferably coil or spiral springs 21. The other ends 21a of respective springs 21 abut against plate or bar 16. It is to be understood that plate 16 also may be recessed to accommodate ends 22 of springs 21, and that one or more springs 21 may be provided, although it has been found that two springs have proved sufficiently practical. It is to be further understood that in lieu of the coil or spiral springs 21, other suitable types of springs may be used, such as, for example, flat or leaf springs.

Bolts, pins, rivets or other suitable members 22 project through and are in slidable engagement with plate 15, base portion 14a of housing 12 and plate 16, and threadedly engage plate 17, as seen at 23.

Interposed between channel plate 15 and bracket mounting bar 24, which is preferably made of steel, is a shock absorbing member 25, preferably made of rubber or rubber composition. Channel plate 15, resilient member 25 and bar 24 are secured together by bolts 9 and nuts 9a, or other suitable means. A purpose for using resilient member 25 between plates 15 and bar 24 is to absorb shock of impact, providing greater protection against damage to the vehicle that otherwise would be possible if the bumper guard unit were rigidly mounted on the bumper.

Threadedly engaging plate 24, member 25, plate 15, base 14a of housing 12 and plate 16 is a substantially tubular member 11 in which is disposed a preferably single pole double-throw electric microswitch 26 (see FIGS. 6 and 7) activated by a plunger P and which reverses contact action when plunger P is depressed by plate 17, such as in a manner hereinafter described.

Bumper guard 10 with the hereinabove described switch means may be attached to bumper 10a of a motor vehicle by means of the brackets 31, bolts 33a and nuts 33b. The heads 30 of bolts 9 are preferably embedded in the base portion 14a of housing 12. Any suitable number of bumper guards with incorporated switch 26 may be employed.

The circuit diagram shown in FIGS. 6 and 7 indicate that two bumper guards, each having a switch 26, is used.

As shown in FIGS. 6 and 7, switch 26 has three contact points 26a, 26b and 26c. Terminal 26c is connected to one terminal of a condenser 27, preferably of substantially 250 microfarads, more or less, the other terminal of condenser 27 being connected to a ground reference 28 which may be the chassis of the vehicle. Terminal 26a is connected to the plus side 29 of motor vehicle battery 30, the minus side of battery 30 being connected to ground reference 28. Terminal 26b of switch 26 is connected to terminal 34 of relay coil 32 contained in control box 33. The other terminal 35 of relay coil 32 is connected to the ground reference 28. Relay coil 32 forms part of a relay system generally indicated by the numeral 36. This relay system 36 comprises the relay coil 32 which operates simultaneously two switches, one of which is indicated by numeral 37 and the other of which is indicated by numeral 38.

Switch 37, which is a double pole switch, has terminal point 37a and two contact points 37b and 37c. Terminal point 37a is connected to the positive terminal of condenser 39 of substantially 3,000 microfarads, more or less, the negative side of condenser 39 being connected to ground reference 28. Contact point 37b is connected to the plus side of battery 30, whereas contact point 37c is connected to terminal 34 of relay coil 32. Switch 37 is a double-throw switch, and is in normally inoperative open position as indicated in FIG. 6 and in closed position as indicated in FIG. 7 when the push-preventing device is in operation.

Switch 38, which is a single-throw switch, has a terminal 40 which is connected to ground reference 28 and so has a contact point 41. Contact point 42 of switch 38 is connected to the negative side of the ignition coil of the motor vehicle ignition system (not shown) through conductor 43. Switch 38 is in normally inoperative open position as indicated in FIG. 6 and is in closed position as indicated in FIG. 7 when the push-preventing device is in operation.

The push-preventing device functions as follows. Let it be assumed that the driver of the motor vehicle, which is equipped with the push-preventing device, such as a taxi cab driver, desires to push a stalled or otherwise disabled car D in front of it. When he attempts to push the disabled vehicle, the push-preventing device is put into operation as follows. Because of the resiliency of housing 12, plate 17 presses against plunger P of switch 25 thereby disconnecting condenser 27 from battery 30. This is accomplished by the plunger P contacting switch arm 26d and throwing the same from contact 26a to contact 26b. When switch arm 26d leaves contact point 26a, it disconnects condenser 27 from the positive terminal of battery 30 and connects condenser 27 to relay coil 32, whereby relay coil 32 is activated to operate switches 37 and 38 of the relay, simultaneously. By doing this, contact point 41 of switch arm 38' contacts terminal 42 and thus grounds the ignition system, and switch arm 37d disconnects from terminal 37b and contacts terminal 37c which permits the electrical charge stored up in condenser 39 to discharge through relay coil 32 which has sufficient resistance to slow up the current flow, which provides the time delay. By switch arm 37d disconnecting from terminal 37b, condenser 39 is disconnected from battery 30.

The purpose of this time delay is to maintain the ignition inoperative allowing sufficient time for the flywheel to come to rest. The reason this is necessary is because the vehicles may not stay in contact long enough for the engine flywheel to come to rest, in which case the engine would restart itself if there was not this time delay, as there is the tendency for the contacting vehicles to bounce apart when one is pushed against the other.

From the foregoing, it can be readily seen that the push-preventing device, according to the invention, can stall the pushing vehicle no matter how short the duration of time of contact with the vehicle being pushed exists.

The time relay system also may be activated through switch means operated by the engine oil pressure system or by the engine manifold vacuum.

As heretofore stated, the time delay is necessary to maintain the ignition system de-energized until after the activity of the engine, because of the momentum of the flywheel, has ceased, and the engine stalled. Thereafter, it becomes necessary to start the motor vehicle engine again to put it in running condition.

Referring now to FIGS. 8, 9 and 10 of the drawings which illustrate a further embodiment by which the invention may be realized, there is shown in FIG. 8, in broken lines, a face bar or bumper 50 of a motor vehicle, such as an automobile, to which there is secured a bumper guard 51 incorporating switch means, made according to the invention. Bumper guard 51 comprises a resilient insulating housing 52 having a channel or passage 53 running therethrough. Housing 52 is made of rubber, rubber composition or other suitable material and is preferably substantially dome-shaped, in section (as seen in FIGS. 9 and 10).

Abutting against the flat side portion 53 of housing 52 is a flat plate 54 which is preferably made of metal, such as, for example, steel. Within channel or passage 53 are two spaced-apart metal plates or bars 55 and 56, preferably made of steel, the space between plates 55 and 56 being indicated by the numeral 57. Spaced recesses 58 are formed in plate or bar 56 accommodating respective end portions 59 of preferably helical springs 60. The other ends 61 of respective springs 60 abut against plate or bar 55. It is to be understood that plate 55 also may be recessed to accommodate ends 61 of springs 60, and that one or more springs 60 may be provided, although it has been found that two springs have proved sufficiently practical. It is to be further understood that in lieu of the helical or spiral springs 60, other suitable types of springs may be used, such as for example, flat or leaf springs.

Bolts, pins or other suitable members 62 project through and are in slidable engagement with plate 54, flat side portion 53 of housing 52 and plate 55, and threadedly engage plate 56, as seen at 63.

Threadedly engaging plate 54, flat side portion 53 of housing 52 and plate 55 is a substantially tubular member 64 in which is disposed the preferably single pole double-throw electric switch 65, similar to switch 26, activated by plunger 66 and which reverses contact action when plunger 66 is depressed by plate 56, such as in a manner hereinafter described.

The device described in FIGS. 8, 9 and 10 may be attached to face plate or bumper 50 of the motor vehicle, by means of bolts 67 and nuts 68. The heads 69 of bolts 67 are preferably embedded in the flat side portion 53 of housing 52 and the shanks 70 of bolts 67 project through plate 54. It is preferable that bolts or members 62 be disposed so as to clear the bumper 50.

While the invention has been described and illustrated with respect to certain preferred examples which give satisfactory results, it will be understood by those skilled in the art after understanding the principle of the invention, that various other changes and modifications may be made without departing from the spirit and scope of the invention, and it is intended therefore in the appended claims to cover all such changes and modifications.

We claim:

1. A device for preventing the pushing of a first vehicle by a second vehicle, comprising switch means contained in a part of said second vehicle which is contactable with said first vehicle when both vehicles are in contact, and means connected to said switch means in such manner as to render said second vehicle inactive immediately upon contact between said vehicles and for a time delay period thereafter.

2. A device according to claim 1, wherein said switch means is contained within a bumper guard on said second vehicle.

3. A device according to claim 2, wherein said switch means comprises an electric switch.

4. A device according to claim 2, wherein said bumper guard comprises a resilient housing having an elongate passage, an elongate member within said passage and said switch means comprises a plurality of electric contacts, and a plunger projecting within said housing and operable by said member when said housing is depressed to close certain of said contacts.

5. A device according to claim 2, wherein said bumper guard comprises a resilient housing, and said switch means comprises a plurality of electric contacts, and a plunger projecting within said housing, said plunger being operable to close certain of said contacts when said housing is depressed.

6. A device according to claim 5, and spring means within said housing for returning said housing to normal condition after being depressed.

7. A device according to claim 2, wherein said pumper guard comprises a resilient housing having an elongate passage, an elongate member within said passage, and said switch means comprises three electric contacts, a switch arm normally engaging two of said contacts, and a plunger projecting within said housing and operable by said member when said housing is depressed to switch said arm out of engagement with one of said two of said contacts and into engagement with the third of said contacts when said housing is depressed.

8. A device according to claim 7, wherein said switch means includes an electric condenser.

9. A device according to claim 1, wherein said bumper guard comprises a resilient housing, and said switch means comprises three electric contacts, a switch arm normally engaging two of said contacts, and a plunger projecting within said housing, said plunger being operable to switch said arm out of engagement with one of said two of said contacts and into engagement with the third of said contacts when said housing is depressed.

10. A device according to claim 9, wherein said switch means includes an electric condenser.

11. A device according to claim 9, and spring means within said housing for returning said housing to normal condition after being depressed.

12. A device for preventing the pushing of a first vehicle by a second vehicle, said second vehicle having an engine, flywheel, an electric ignition system and source of power; comprising switch means contained in a part of said second vehicle which is contactable with said first vehicle when both vehicles are in contact, and means connected to said switch means in such a manner as to render said second vehicle inactive upon contact between said vehicles and for a time delay period thereafter, said latter means comprising an electric relay system having an induction coil and switch means, said latter switch means having a terminal connected to said ignition system, a terminal connected to the power source of said second vehicle, a terminal connected to an electric condenser, a terminal connected to said induction coil, and a terminal connected to a ground reference, said power source, said condenser and said induction coil being connected to said ground reference, a switch arm connected to said terminal which is connected to said ground reference and connectable normally wtih said terminal which is connected to said ignition system, and a second switch arm connected to said terminal which is connected to said condenser and movable from a position in contact with said power source connected terminal to said induction coil connected terminal to discharge the electric charge stored in said condenser into said relay coil upon engagement of said second vehicle with said first vehicle.

13. A device for preventing the pushing of a first vehicle by a second vehicle, said second vehicle having an engine, flywheel and an electric ignition system and source of power; comprising a switch means contained in a part of said second vehicle which is contactable with said first vehicle when both vehicles are in contact, and means connected to said switch means in such a manner as to render said second vehicle inactive upon contact between said vehicles and for a time delay period thereafter, said latter means comprising an electric relay system having an induction coil and switch means, said latter switch means being connectable to said ignition system, being connected to said power source, being connectable to an electric condenser, and being connectable to said induction coil; said power source, said condenser and said induction coil being connected to a ground reference, a contact arm connected to said ground reference and connectable with said ignition system, and a second contact arm connected to said condenser and movable from a position in contact with said power source to a position in contact with said induction coil to discharge the electric charge stored in said condenser into said induction coil upon engagement of said second vehicle with said first vehicle.

14. A device for preventing the pushing of a first vehicle by a second vehicle, said second vehicle having an engine, a flywheel, an electric ignition system and a source of power; comprising switch means contained in a part of said second vehicle which is contactable with said first vehicle when both vehicles are in contact, and means connected to said switch means in such a manner as to render said second vehicle inactive upon contact between said vehicles and for a time delay period thereafter, said switch means comprising three electric contacts, one of said contacts being connected to said power source, a second of said contacts being connected to a ground reference, a contact arm normally engaging two of said contacts and a depressable member, said member being operable to switch said arm out of engagement with one of said two of said contacts and into engagement with the third of said contacts when said member is depressed, said means connected to said switch means comprising an electric relay system having an induction coil and switch means, said latter switch means being connectable to said ignition system, being connectable to the power source, being connected to an electric condenser, and being connectable to said induction coil, said power source, said condenser and said induction coil being connected to a ground reference, a contact arm connected to said ground reference and movable to a posoition in contact with said ignition system, and a second contact arm connected to said condenser and movable from a position in contact with said power source to a position in contact with said coil to discharge the electric charge stored in said condenser into said coil upon engagement of said second vehicle with said first vehicle.

15. A device for preventing the pushing of a first vehicle by a second vehicle, said second vehicle having an engine, a flywheel, an electric ignition and source of electric power; comprising switch means located on said second vehicle which is contactable with said first vehicle when both vehicles are in contact, and means connected to said switch means as to render said second vehicle inactive immediately upon contact between said vehicles and for a time delay period thereafter, said switch means being connected to said power source and being provided with a depressable member, said means connected to said switch means being provided with said time delay means, said member being operable to operate said switch means when depressed to activate said time delay means upon contact of said vehicle whereby the ignition system is de-energized upon said contact during operation of said flywheel.

References Cited by the Examiner
UNITED STATES PATENTS

| | | | |
|---|---|---|---|
| 1,625,505 | 4/1927 | Stump et al. | 200—61.44 |
| 1,823,950 | 9/1931 | Mechetti | 180—83 |
| 1,833,948 | 12/1931 | Lansing | 200—16 X |
| 2,177,386 | 10/1939 | Gearin | 200—61.44 X |
| 2,299,941 | 10/1942 | Townsend | 217—141 |
| 2,730,396 | 1/1956 | Johnson | 180—83 |
| 3,154,168 | 10/1964 | Wilmot | 180—82 |

KENNETH H. BETTS, *Primary Examiner.*